(12) United States Patent
Bodin et al.

(10) Patent No.: US 10,567,459 B2
(45) Date of Patent: Feb. 18, 2020

(54) USING SOCIAL SHARES TO UNLOCK MEDIA FILES

(71) Applicant: International Business Machines Corporation, Armonk, NY (US)

(72) Inventors: William K. Bodin, Austin, TX (US); Lisa Seacat DeLuca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/157,694

(22) Filed: May 18, 2016

(65) Prior Publication Data

US 2017/0339205 A1 Nov. 23, 2017

(51) Int. Cl.
*H04L 29/06* (2006.01)
*H04L 29/08* (2006.01)

(52) U.S. Cl.
CPC .......... *H04L 65/604* (2013.01); *H04L 67/22* (2013.01); *H04L 67/327* (2013.01)

(58) Field of Classification Search
CPC ....... H04L 65/604; H04L 43/16; H04L 67/22; H04L 67/327; H04L 65/4084; H04L 67/42; H04L 63/101; H04L 67/1012; H04L 67/1014; H04L 67/306; H04N 21/23418; H04N 21/8456; H04N 21/4667; H04N 21/23424; H04N 21/4394; H04N 21/47217; H04N 21/23406; H04N 21/4532; H04N 21/482; H04N 21/23439; H04N 21/25808; H04N 21/2743; H04N 21/2387; H04N 21/2405; H04N 21/2541; H04N 21/2543; H04N 21/44; H04N 21/4405; H04N 21/4781; G06F 21/10; G06F 21/6209; G06F 21/60; G06F 16/3344; G06F 16/4387
USPC ....................................... 709/217
See application file for complete search history.

(56) References Cited

U.S. PATENT DOCUMENTS

| | | | |
|---|---|---|---|
| 2006/0041527 A1* | 2/2006 | Fessler | G06F 16/164 |
| 2008/0016533 A1* | 1/2008 | Rothschild | H04N 7/17318 |
| | | | 725/60 |
| 2008/0320139 A1 | 12/2008 | Fukuda et al. | |
| 2012/0172132 A1* | 7/2012 | Molyneaux | A63F 13/69 |
| | | | 463/42 |
| 2014/0006415 A1* | 1/2014 | Rubchinsky | G06F 17/30648 |
| | | | 707/748 |

(Continued)

OTHER PUBLICATIONS

Len Video Locker.wordpress.org/plugins/ilen-video-locker/. (Dec. 11, 2014). (2 pgs).

*Primary Examiner* — Thomas J Dailey
*Assistant Examiner* — Aye M Aung
(74) *Attorney, Agent, or Firm* — Cantor Colburn LLP; Samuel Waldbaum (57) ABSTRACT

Embodiments are directed to a computer implemented method and system of restricting access to portions of a media file. The method includes marking a media file such that it has at least two portions. All of the portions are locked except the first portion. The number of times the media file is shared is tracked. Thereafter, a second portion can be unlocked once a threshold number of shares has been tracked. Shares can include social media shares, views, and the like. The media file can be a video file, audio file or other type of media file. Other embodiments are also disclosed.

20 Claims, 3 Drawing Sheets

(56) References Cited

U.S. PATENT DOCUMENTS

| | | | |
|---|---|---|---|
| 2014/0068549 A1 | 3/2014 | Friedman et al. | |
| 2014/0179246 A1* | 6/2014 | Balijapalli | H04B 1/406 455/92 |
| 2014/0179426 A1* | 6/2014 | Perry | A63F 13/10 463/31 |
| 2015/0119149 A1* | 4/2015 | Spitzer | A63F 13/77 463/43 |
| 2015/0294366 A1* | 10/2015 | Oberbrunner | G06Q 30/0269 705/14.5 |
| 2015/0378560 A1* | 12/2015 | Wu | G06Q 20/123 715/764 |
| 2016/0048286 A1* | 2/2016 | Picon | G06F 3/0488 463/33 |
| 2016/0134638 A1* | 5/2016 | Tulshibagwale | H04L 63/105 726/4 |
| 2016/0182600 A1* | 6/2016 | Swaminathan | H04L 67/02 709/217 |
| 2016/0261658 A1* | 9/2016 | Taylor | H04L 65/4076 |
| 2017/0228547 A1* | 8/2017 | Smith | H04L 9/085 |
| 2017/0245023 A1* | 8/2017 | Brelis | G11B 27/00 |
| 2017/0289639 A1* | 10/2017 | Reisner | H04N 21/4882 |

* cited by examiner

USING SOCIAL SHARES TO UNLOCK MEDIA FILES

The present disclosure relates in general to the field of computing. More specifically, the present disclosure relates to systems and methodologies for the unlocking of media files based on social shares.

BACKGROUND

The online sharing of videos and other media files has become very popular, allowing individuals and entities to distribute and share video files and audio files in a simple manner. Because of the popularity of media files, advertising campaigns that use media files have become more prevalent.

SUMMARY

Embodiments are directed to a computer implemented method. The method includes marking, using a processor system, a media file such that it has at least two portions. The method further includes locking, using the processor system, all portions of the media file except the first portion of the media file, as well as tracking, using the processor system, a number of shares of the media file. The method further includes unlocking, using the processor system, a second portion of the media file when the number of shares of the media file exceeds a threshold number of shares.

Embodiments are further directed to a computer system. The system includes a memory and a processor system communicatively coupled to the memory. The processor is configured to perform a method that includes marking a media file such that is has at least two portions. The method further includes locking all portions of the media file except the first portion of the media file, as well as tracking a number of shares of the media file. The method further includes unlocking a second portion of the media file when the number of shares of the media file exceeds a threshold number of shares.

Embodiments are further directed to a computer program product. The computer program product includes a computer-readable storage medium having program instructions embodied therewith, wherein the computer-readable storage medium is not a transitory signal per se. The program instructions are readable by a processor system to cause the processor system to perform a method that includes marking a media file such that it has at least two portions. The method further includes locking all portions of the media file except the first portion of the media file, as well as tracking a number of shares of the media file. The method further includes unlocking a second portion of the media file when the number of shares of the media file exceeds a threshold number of shares.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the present disclosure will now be described with reference to the related drawings. Alternate embodiments may be devised without departing from the scope of this disclosure. Various connections might be set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

At least the features and combinations of features described in the present application, including the corresponding features and combinations of features depicted in the figures, amount to significantly more than implementing a method of analyzing data in a particular technological environment. Additionally, at least the features and combinations of features described in the present application, including the corresponding features and combinations of features depicted in the figures, go beyond what is well-understood, routine and conventional in the relevant field(s).

Many entities have attempted to use "viral video" advertising campaigns to publicize a product or service. A viral video (or other media content) is one that becomes popular through a viral process of video sharing, typically through video sharing websites, social media, and email. An exemplary viral campaign might involve a first video that has a "call to action." The video might air in a variety of locations, such as on the Internet or via television commercials. The "call to action" might appear at the end of the video and be a request to visit a certain website to access additional videos. The "call to action" might be a request to share the video via social media. Examples might include an entity that airs a commercial containing the first part of a story on a popular television program, such as the Super Bowl™ and requests you to visit their website to view the remainder of the commercial. A consumer would then visit the entity's website to view a second video that contains the remainder of the story.

It would be desirable to have an improved method and system for the use and promotion of media files because there might be several drawbacks to such a manner of advertising. For example, there is no manner of measuring the impact of the original commercial. In addition, the "buzz" (i.e., the level of interest) created by the initial commercial might be short-lived.

Accordingly, one or more embodiments of the present disclosure provide the ability to restrict the ability to access additional content (such as additional videos or portions of videos that continue a storyline that started in the first video). In some embodiments, the restriction on the ability to view the additional content might be based on the number of times the first video has been "shared." In some embodiments, the first video might be a portion of a longer video and the "additional content" can be a later portion of the same video. As described in detail herein, one or more embodiments of the present disclosure provide systems, methods and computer program products in which a media file can be played to a given point in time based on the number of shares the video has received. In one or more embodiments, media is prohibited from playing past a certain point until it is shared a certain threshold number of times. In one or more embodiments, once a threshold number of shares is reached, another threshold might exist. Eventually, after all thresholds have been met, the entire media can be played.

Example embodiments of the disclosure include or yield various technical features, technical effects, and/or improvements to technology. For instance, example embodiments of the disclosure provide the technical effect of restricting the playback of a media file in an attempt to drive views to the media file. This technical effect is achieved as a result of the technical features of marking a media file such that it has multiple portions and restricting playback of some portions until a threshold number of shares has occurred. As a result of the aforementioned technical features and technical effects, example embodiments of the disclosure constitute an improvement to existing technology. It should be appreciated that the above examples of technical features, technical effects, and improvements to technology of example embodiments of the disclosure are merely illustrative and not exhaustive.

Figure 1:
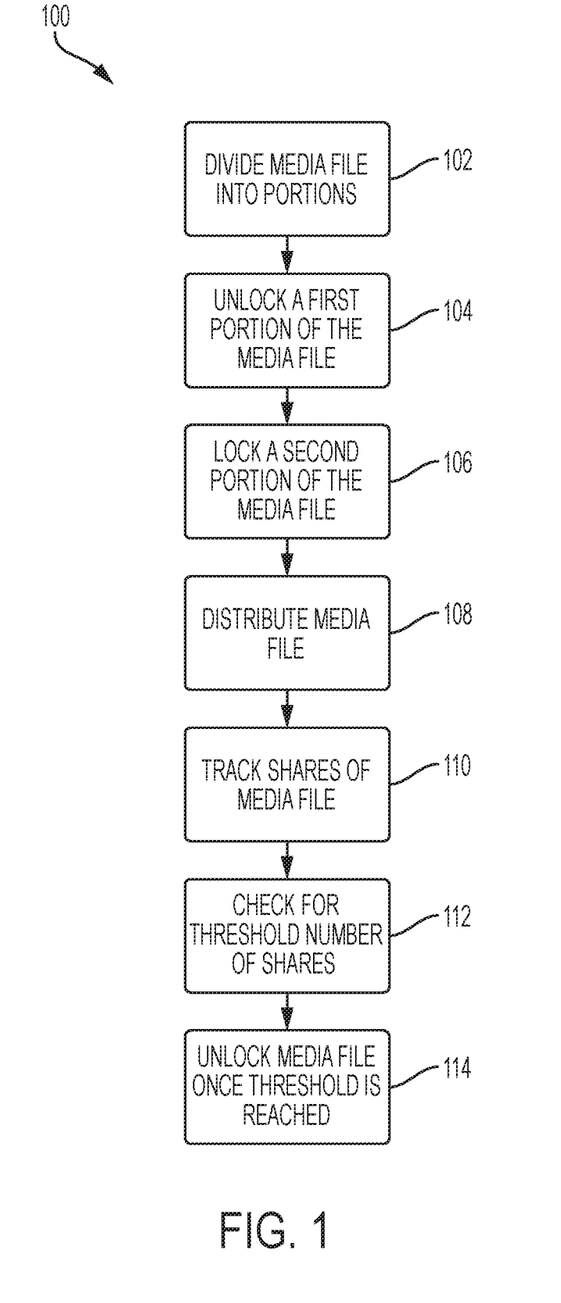
FIG. 1 depicts a flowchart illustrating the operation of an embodiment.

A flowchart illustrating a method 100 is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, the procedures, processes, and/or activities of method 100 can be performed in any other suitable order. In still other embodiments, one or more of the procedures, processes, and/or activities of method 100 can be combined or skipped.

Method 100 might be performed by any entity that wishes to restrict the access to media files until a certain amount of publicity has been attained. A media file is marked such that it has two or more portions (block 102). The media file can be in one of a variety of different formats, such as audio only, video only, still images, text, and the like. A first portion of the media file is unlocked (block 104) while a second portion of the media file is locked (block 106).

The portions of the media files can be marked in a variety of different manners. If the media file is a text file, each portion of the media file can represent a separate chapter or section of the text file. If the media file is music file, such as an album, each portion can be a track of the album. If the media file is a video file, each portion can be a chapter of the video file, with each chapter representing a different scene of a movie or video. In some embodiments, each portion can be determined on a time basis. For example, a 10-minute file can be marked such that it has two 5-minute portions or three portions, each of which is 3 minutes and 20 seconds. In some embodiments, each portion can have a different length. In some embodiments, the marking involves the use of a mechanism to indicate the beginning and end of each portion of the file. An exemplary mechanism might be the use of metadata. Other methods can also be used.

The media file is distributed to a plurality of users (block 108). Sharing of the media file is tracked (block 110). This can be accomplished in one of a variety of different manners. In some embodiments, social media is tracked to determine the number of shares. Each time the media file is promoted by a user on a social media site including, but not limited to, Twitter™, Facebook™, and the like, a counter can be incremented. Many different techniques can be used to count such social media shares, both those currently known and those developed in the future. Other manners of promoting a media file can also be tracked, such as shares via email or through the use of tracking cookies on websites on which the media file is shared. In some embodiments, a number of views or listens can be tracked. For example, sites such as YouTube™ and Facebook™ allow entities the ability to track how many times a video file has been accessed. In some embodiments, the number of comments received for a media file can be tracked. In some embodiments, a combination of the number of shares, number of views, number of comments, and the like can be combined in one of a variety of different manners.

In some embodiments, a message can be displayed to a user when the end of the first portion of the media has been reached. For example, if the media file is a video file, a message (e.g., text, audio or video) can be displayed on the video player that informs the user that the next portion of the video is locked until a threshold number of shares to unlock the next portion of the media file is reached. The message can encourage the viewer to share the media file in one of a variety of different manners to unlock the next portion of the media file.

Once a threshold number of shares has occurred (block 112), access to the second portion of the media file is unlocked (block 114). In some embodiments, there might be only two portions of the media file, such that unlocking the second portion of the media file means the entire media file is unlocked. In some embodiments, there might be three of more portions of the media file. Therefore, after unlocking the second portion, there is still at least one portion of the media file to be unlocked. In such a case, blocks 110, 112, and 114 are repeated until all portions of the media file are unlocked. In the case where there are more than two portions of the media file, there can be a different number of shares used as a threshold value. In some embodiments, the threshold number of shares can be the same for each portion. For example, there might be a threshold of 1,000 shares before the second portion is unlocked, a threshold of 2,000 shares before the third portion is unlocked, and a threshold of 3,000 shares before the fourth portion is unlocked. In some embodiments, there can be an increasing threshold for each portion. For example, there might be a threshold of 1,000 shares before the second portion is unlocked, but a threshold of 10,000 shares before the third portion is unlocked, and a threshold of 50,000 shares before the fourth portion is unlocked.

The locking and unlocking of a media file can be accomplished in one of a variety of different manners, both currently known and those developed in the future. Access to newly unlocked portions of the media file can be granted in a variety of different manners, both currently known and those developed in the future. In some embodiments, metadata can be embedded in the media file that contains information regarding how much of the media file is unlocked. When a portion of the media file becomes unlocked, the metadata can be changed such that the newly unlocked portion is available. In some embodiments, the metadata can access a file located on a server that tracks how much of the media file is unlocked and how much is locked. When a portion of the media file becomes unlocked, such information is accessed and the portion in issue is unlocked.

In some embodiments, a user can request to receive notification when a portion of the media file becomes unlocked. The user can submit a phone number, an email address, or other way to be notified. Thereafter, when a portion of the media file becomes unlocked, the user is sent a text message, an email, or other notification.

A system or method using an embodiment described above allows an entity to track the popularity of the viral campaign. Embodiments also provide a method of further publicizing the viral campaign. For example, if the threshold number of shares is to unlock the second portion once the first portion has been shared 100,000 times, the entity doing the advertising has the opportunity to update people as to how many more shares are needed, in essence, providing additional advertising.

Figure 2:
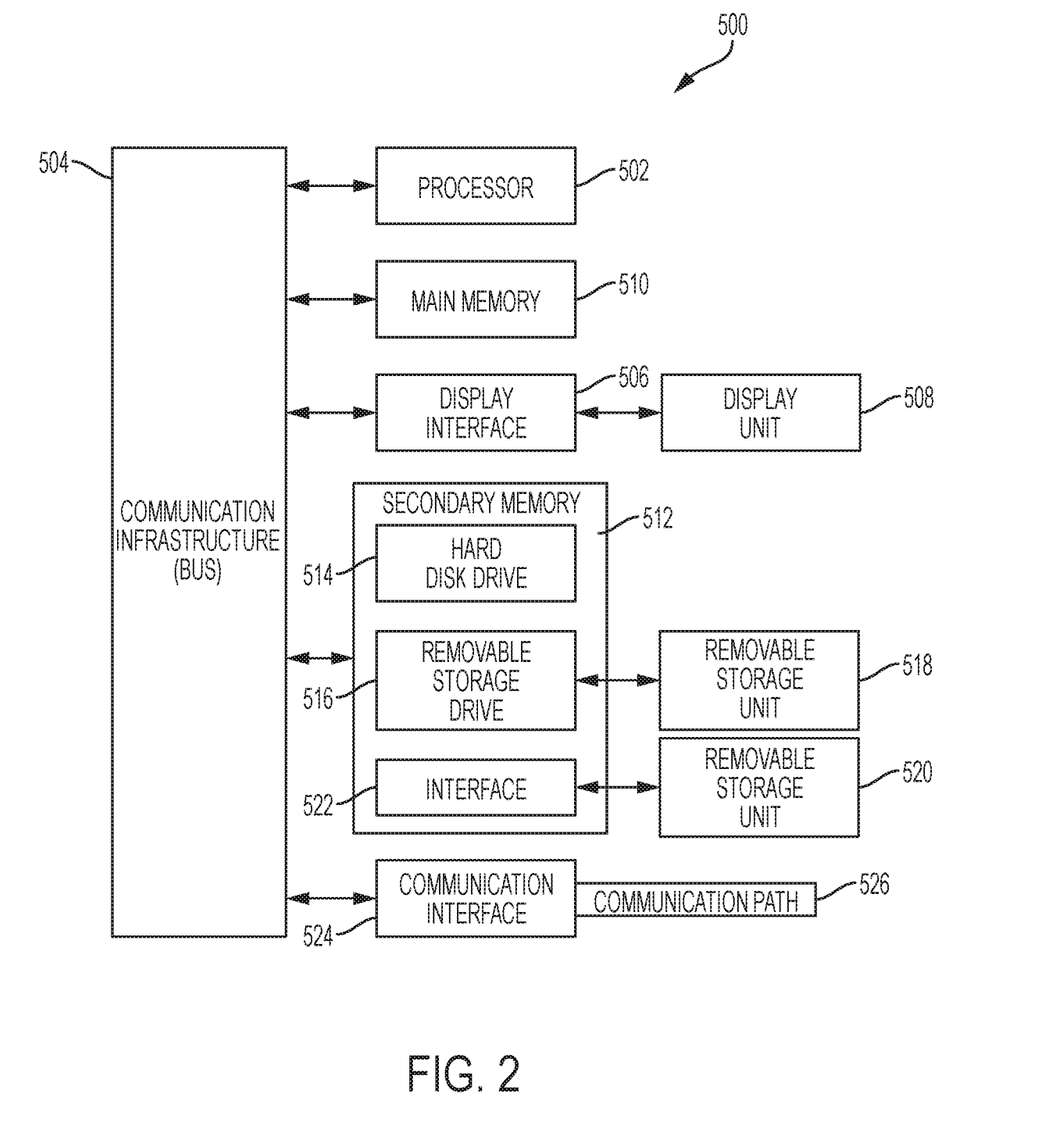
FIG. 2 depicts a computer system capable of implementing hardware components of one or more embodiments.

FIG. 2 depicts a high level block diagram computer system 500, which may be used to implement one or more embodiments of the present disclosure. More specifically, computer system 500 may be used to implement hardware components of systems capable of performing methods described herein. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also may be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PC card slot and card, a universal serial bus port (USB), and the like. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present disclosure, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features of the present disclosure as discussed herein. In particular, the computer programs, when run, enable processor 502 to perform the features of the computer system. Accordingly, such computer programs represent controllers of the computer system. Thus it can be seen from the forgoing detailed description that one or more embodiments of the present disclosure provide technical benefits and advantages.

Figure 3:
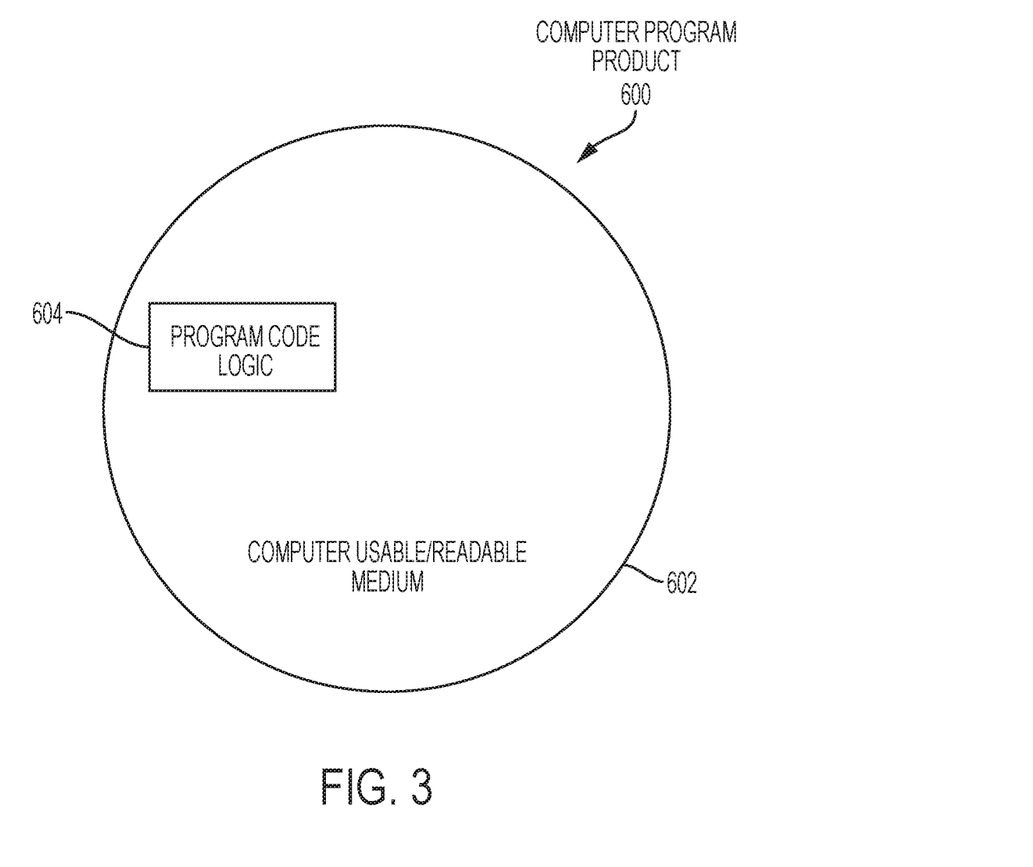
FIG. 3 depicts a diagram of a computer program product according to one or more embodiments.

Referring now to FIG. 3, a computer program product 600 in accordance with an embodiment that includes a computer-readable storage medium 602 and program instructions 604 is generally shown.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the entity's computer, partly on the entity's computer, as a stand-alone software package, partly on the entity's computer and partly on a remote computer or entirely on the remote computer or server. In the latter scenario, the remote computer may be connected to the entity's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

It should be understood that, while portions of this disclosure discuss the use of video files, this disclosure is applicable to any type of digital media content, including, but not limited to, video files, audio files, photographs, text files, and the like. For example, embodiments can be used as a way of distributing a short story or other type of text document to build up a "buzz" for the story. Embodiments can be used for the distribution of a podcast, where only portions of an interview are accessible until the threshold number of shares occurs. Embodiments can be used for the distribution of a music album, with each track only being accessible when a threshold number of shares occurs. Other types of media files can also be shared using techniques described herein.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
    marking, using a processor system, a media file such that it has at least three portions, wherein the marking is based at least in part on a respective duration of time of each of the at least three portions;
    locking, using the processor system, all portions of the media file except a first portion of the media file;
    providing, at the end of the first portion, a visual display indicating a first threshold number of shares required to unlock a second portion of the media file; tracking, using the processor system, a number of shares of the media file;
    receiving a request from a user for notification, via a desired electronic format, that a second portion is unlocked;
    determining, using the processor system, that the number of shares of the media file exceeds the first threshold number of shares;
    unlocking, using the processor system, the second portion of the media file responsive, at least in part, to determining that the number of shares of the media file exceeds the first threshold number of shares;
    transmitting, using the processing system, notification to the user that the second portion is unlocked via the desired electronic format;
    determining, using the processor system, that the number of shares of the media file exceeds a second threshold number of shares, wherein the second threshold is greater than the first threshold, and wherein the second threshold number of shares is an exponential increase from the first threshold number of shares; and
    unlocking, using the processor system, a third portion of the media file responsive, at least in part, to determining that the number of shares of the media file exceeds the second threshold number of shares.

2. The computer-implemented method of claim 1 wherein:
    unlocking the second portion of the media file comprises maintaining a lock on the third portion of the media file while unlocking the second portion of the media file.

3. The computer-implemented method of claim 1 further comprising:
    distributing the media file with at least one portion of the media file being locked;
    wherein the media file is configured to only allow playback of the unlocked portion of the media file.

4. The computer-implemented method of claim 3 wherein:
    the media file is configured to display a message at the end of the first portion of the media file to indicate a locked status of the second portion of the media file.

5. The computer-implemented method of claim 1 wherein:
    tracking the number of shares of the media file comprises counting a number of times that the media file has been shared via social media.

6. The computer-implemented method of claim 5 wherein:
    tracking the number of shares of the media file further comprises counting a number of times that the media file has been viewed.

7. The computer-implemented method of claim 1 wherein:
    each portion of the media file has an equal length.

8. The computer-implemented method of claim 1 wherein:
    marking the media file comprises marking the media file based on a received request indicating the respective duration of time of each of the at least three portions.

9. A computer system comprising:
    a memory; and
    a processor system communicatively coupled to the memory;
    the processor system configured to perform a method comprising:
        marking a media file such that it has at least three portions, wherein the marking is based at least in part on a respective duration of time of each of the at least three portions;
        locking all portions of the media file except a first portion of the media file;
        providing, at the end of the first portion, a visual display indicating a first threshold number of shares required to unlock a second portion of the media file; tracking a number of shares of the media file;
        receiving a request from a user for notification, via a desired electronic format, that a second portion is unlocked;
        determining, using the processor system, that the number of shares of the media file exceeds the first threshold number of shares;
        unlocking, using the processor system, the second portion of the media file responsive, at least in part, to determining that the number of shares of the media file exceeds the first threshold number of shares;
        transmitting, using the processing system, notification to the user that the second portion is unlocked via the desired electronic format;
        determining, using the processor system, that the number of shares of the media file exceeds a second threshold number of shares, wherein the second threshold is greater than the first threshold, and wherein the second threshold number of shares is an exponential increase from the first threshold number of shares; and
        unlocking, using the processor system, a third portion of the media file responsive, at least in part, to determining that the number of shares of the media file exceeds the second threshold number of shares.

10. The computer system of claim 9 wherein:
    unlocking the second portion of the media file comprises maintaining a lock on the third portion of the media file while unlocking the second portion of the media file.

11. The computer system of claim 9 further comprising:
    distributing the media file with at least one portion of the media file being locked;

wherein the media file is configured to only allow playback of the unlocked portion of the media file.

12. The computer system of claim 11 wherein:
the media file is configured to display a message at the end of the first portion of the media file to indicate a locked status of the second portion of the media file.

13. The computer system of claim 9 wherein:
tracking the number of shares of the media file comprises counting a number of times that the media file has been shared via social media.

14. The computer system of claim 13 wherein:
tracking the number of shares of the media file further comprises counting a number of times that the media file has been viewed.

15. The computer system of claim 9 wherein:
each portion of the media file has an equal length.

16. The computer system of claim 9 wherein:
marking the media file comprises marking the media file based on a received request indicating the respective duration of time of each of the at least three portions.

17. A computer program product comprising:
a computer-readable storage medium having program instructions embodied therewith, wherein the computer-readable storage medium is not a transitory signal per se, the program instructions readable by a processor system to cause the processor system to perform a method comprising:
marking a media file such that it has at least three portions, wherein the marking is based at least in part on a respective duration of time of each of the at least three portions;
locking all portions of the media file except the first portion of the media file;
providing, at the end of the first portion, a visual display indicating a first threshold number of shares required to unlock a second portion of the media file; tracking a number of shares of the media file;
receiving a request from a user for notification, via a desired electronic format, that a second portion is unlocked;
unlocking, using the processor system, the second portion of the media file responsive, at least in part, to determining that the number of shares of the media file exceeds the first threshold number of shares;
transmitting, using the processing system, notification to the user that the second portion is unlocked via the desired electronic format;
determining, using the processor system, that the number of shares of the media file exceeds a second threshold number of shares, wherein the second threshold is greater than the first threshold, and wherein the second threshold number of shares is an exponential increase from the first threshold number of shares; and
unlocking, using the processor system, a third portion of the media file responsive, at least in part, to determining that the number of shares of the media file exceeds the second threshold number of shares.

18. The computer program product of claim 17 wherein:
unlocking the second portion of the media file comprises maintaining a lock on the third portion of the media file while unlocking the second portion of the media file.

19. The computer program product of claim 17 further comprising:
distributing the media file with at least one portion of the media file being locked;
wherein the media file is configured to only allow playback of the unlocked portion of the media file.

20. The computer program product of claim 19 wherein:
the media file is configured to display a message at the end of the first portion of the media file to indicate a locked status of the second portion of the media file.

* * * * *